(12) United States Patent
Pinto

(10) Patent No.: US 7,600,623 B1
(45) Date of Patent: Oct. 13, 2009

(54) INCLUSION OF AN ANTI-DRAIN VALVE IN VISCOUS FAN CLUTCHES

(75) Inventor: Archibald E Pinto, Fontana, CA (US)

(73) Assignee: Standard Motor Products, Long Island City, NY (US)

( * ) Notice: Subject to any disclaimer, the term of this patent is extended or adjusted under 35 U.S.C. 154(b) by 336 days.

(21) Appl. No.: 11/349,518

(22) Filed: Feb. 6, 2006

(51) Int. Cl.
*F16D 35/02* (2006.01)

(52) U.S. Cl. ................ 192/58.682; 192/58.7; 192/58.8

(58) Field of Classification Search ... 192/58.5–58.684, 192/58.7, 58.8
See application file for complete search history.

(56) References Cited

U.S. PATENT DOCUMENTS

| | | | |
|---|---|---|---|
| 4,312,433 A | | 1/1982 | Bopp |
| 4,351,426 A | | 9/1982 | Bopp |
| 4,421,216 A | * | 12/1983 | Ellis .......................... 192/58.8 |
| 4,437,554 A | * | 3/1984 | Haeck ...................... 192/58.62 |
| 4,544,053 A | * | 10/1985 | Yamaguchi et al. ....... 192/58.62 |
| 4,570,771 A | | 2/1986 | Yamaguchi et al. |
| 4,898,267 A | | 2/1990 | Garrett et al. |
| 4,924,987 A | | 5/1990 | Kennedy |
| 4,995,494 A | | 2/1991 | Kennedy et al. |
| 5,014,836 A | * | 5/1991 | Harima et al. ............. 192/58.8 |
| 5,022,507 A | * | 6/1991 | Kennedy et al. ........... 192/58.8 |
| 5,119,921 A | | 6/1992 | Drennen et al. |
| 5,404,977 A | | 4/1995 | Martin et al. |
| 5,839,558 A | | 11/1998 | Kennedy |
| 5,893,442 A | * | 4/1999 | Light ...................... 192/58.61 |
| 6,050,229 A | | 4/2000 | Inoue |
| 6,443,283 B1 | * | 9/2002 | Augenstein et al. ...... 192/58.61 |
| 7,044,282 B2 | * | 5/2006 | Saunders, III .......... 192/58.682 |
| 7,191,883 B2 | * | 3/2007 | Angermaier ............. 192/58.61 |
| 2005/0029070 A1 | | 2/2005 | Barnes et al. |
| 2005/0061264 A1 | | 3/2005 | Langervik |

* cited by examiner

*Primary Examiner*—Richard M. Lorence
(74) *Attorney, Agent, or Firm*—DeLio & Peterson, LLC; John J. Tomaszewski

(57) ABSTRACT

A viscous fluid clutch assembly used in automobiles, SUVs, and trucks minimizes flow back of the cooling fluid from the reservoir towards the working chamber of the clutch when the vehicle is at rest and avoids excessive fan noise, wasted power and fuel inefficiency when a cold automobile engine is started. The clutch utilizes a discharge channel extending from the periphery of the working chamber to the reservoir and a specially designed ball check valve at the entrance to the reservoir which is open or closed depending on operation of the vehicle. The ball check valve is fluidly connected to the working chamber of the fluid clutch by a preferred articulated discharge channel which starts at the working chamber of the fluid clutch and ends at the reservoir of the fluid clutch.

2 Claims, 4 Drawing Sheets

INCLUSION OF AN ANTI-DRAIN VALVE IN VISCOUS FAN CLUTCHES

BACKGROUND OF THE INVENTION

1. Field of the Invention

The present invention relates to viscous fluid fan clutches such as clutches used in the automotive industry for controlling the amount of torque transmitted to a radiator cooling fan as a function of the temperature of a coolant fluid and, in particular, an anti-flowback check valve for the viscous fluid clutch which minimizes flowback of the viscous fluid from a reservoir to the working chamber of the fan clutch when the automobile is not being used and avoids excessive fan noise, wasted power and fuel inefficiency when a cold automobile engine is started.

2. Description of Related Art

Automobile fan clutches typically are "on-off" and "modulating" type devices and couple the cooling fan to the water pump. A fan clutch is activated by moving a viscous fluid in the clutch, typically, dimethyl-silicone from a storage chamber (reservoir) to a working chamber which couples a driving member to a driven member. The movement of fluid is controlled by mechanically opening or closing one or more ports in a plate that separates the storage chamber from the working chamber using typically a temperature sensing element or electromechanical means which moves a gate to open or close the ports. After performing its work during the circulation cycle, the ports are closed and the viscous fluid is returned to the storage chamber from the working chamber by pressure generated from shearing of the viscous fluid and centrifugal force. A passageway is provided to transport the fluid as the end of its useful stage in the working chamber to the reservoir.

The return passageway has an inherent problem when the automobile is stationary for a long period of time (for example, over night parking or storage) in that the passageway may be facing an orientation below the horizontal point. The fluid from the reservoir then has the ability to drain back from the reservoir to the working chamber. The probability for such orientation is as high as 50% and when the vehicle is then started any drained fluid in the working chamber will cause the fan clutch to engage resulting in excessive fan noise, wasted power and fuel inefficiency. With the fluid being at prevailing ambient conditions, the fluid has a relatively higher viscosity than compared to normal operations and the higher viscosity fluid thereby requires considerable time before it can work its way back from the working chamber to the storage chamber. This phenomenon is even more pronounced in cold weather conditions and is referred to as "morning thickness".

To overcome this nuisance problem, manufacturers have included designs to minimize the amount of fluid drain back by orienting the return passageway at oblique angles. Other designs incorporate channels which are concentric to the storage chamber resulting in further reducing the amount of fluid to drain back. This design, though effective towards eliminating morning thickness, complicates the design by having to overcome the added resistance from the length of the channels. The channel has to be rotation specific or otherwise adds undue weight to the proper balance of the assembly.

In U.S. Pat. No. 5,022,507 issued to Kennedy et al. and assigned to General Motors Corporation, a viscous fluid fan clutch assembly is shown containing check valves in discharge channels to prevent the flowback of fluid from the reservoir to the discharge channels and into the working chamber, particularly when the clutch assembly is not in operation. This patent is hereby incorporated by reference.

U.S. Pat. No. 4,544,053 shows a temperature-responsive fluid coupling device for driving a cooling fan of an internal combustion engine and includes a ball check valve mechanism positioned in both the fluid return passage and a pumping passage. Springs are used to maintain the check valve in a closed position. U.S. Pat. No. 4,924,987 shows a fan clutch assembly wherein a check valve is provided in an orifice to control the flow of fluid that permits only one-way flow from the receiving chamber or working chamber into the reservoir. The check valve eliminates the migration of fluid through the orifice from the reservoir into the receiving or working chamber. The disclosures of both these patents are hereby incorporated by reference.

While the prior art has shown viscous fan clutches containing check valves and other mechanisms to prevent flowback of the fluid from the reservoir to the working chamber when the vehicle is not in operation, there is still a need for an enhanced fan clutch which will operate in a more efficient manner.

Bearing in mind the problems and deficiencies of the prior art, it is therefore an object of the present invention to provide a viscous fan clutch which utilizes a check valve to minimize the flowback of fluid in the clutch from the reservoir to the working chamber.

It is another object of the present invention to provide a viscous fan clutch for an automobile which utilizes a check valve in the fan clutch to minimize flowback of fluid in the clutch from the reservoir to the working chamber when the automobile is at rest.

Still other objects and advantages of the invention will in part be obvious and will in part be apparent from the specification.

SUMMARY OF THE INVENTION

The above and other objects, which will be apparent to those skilled in the art, are achieved in the present invention which is directed to in a first aspect a viscous fluid clutch assembly comprising:

(a) a clutch plate rotatably driven by an input shaft;

(b) a housing assembly means comprising a housing and a cover having a hollow interior rotatably mounted on the input shaft;

(c) a shear zone disposed between the clutch plate and the cover;

(d) a partition plate mounted internally in the housing assembly means for dividing the interior of the housing assembly means into a fluid reservoir and a working chamber, wherein the shear zone is disposed in the working chamber;

(e) one or more openings provided in the partition plate for transferring fluid between the working chamber and the fluid reservoir;

(f) a rotatable control arm for opening or closing the openings in the partition plate;

(g) control means for controlling the rotatable control arm based on the temperature of the fluid;

(h) a discharge channel provided in the cover at the periphery of the shear zone and having a first end for receiving fluid exiting from the shear zone and a second end for directing the fluid to the fluid reservoir; and (i) check ball valve means provided at the second end of the discharge channel to prevent migration of fluid from the reservoir into the discharge channel.

In a preferred feature of the invention a dam is provided at the periphery of the shear zone to change the direction of the viscous fluid from tangential to axial.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-3B of the drawings in which like numerals refer to like features of the invention.

Figure 1:
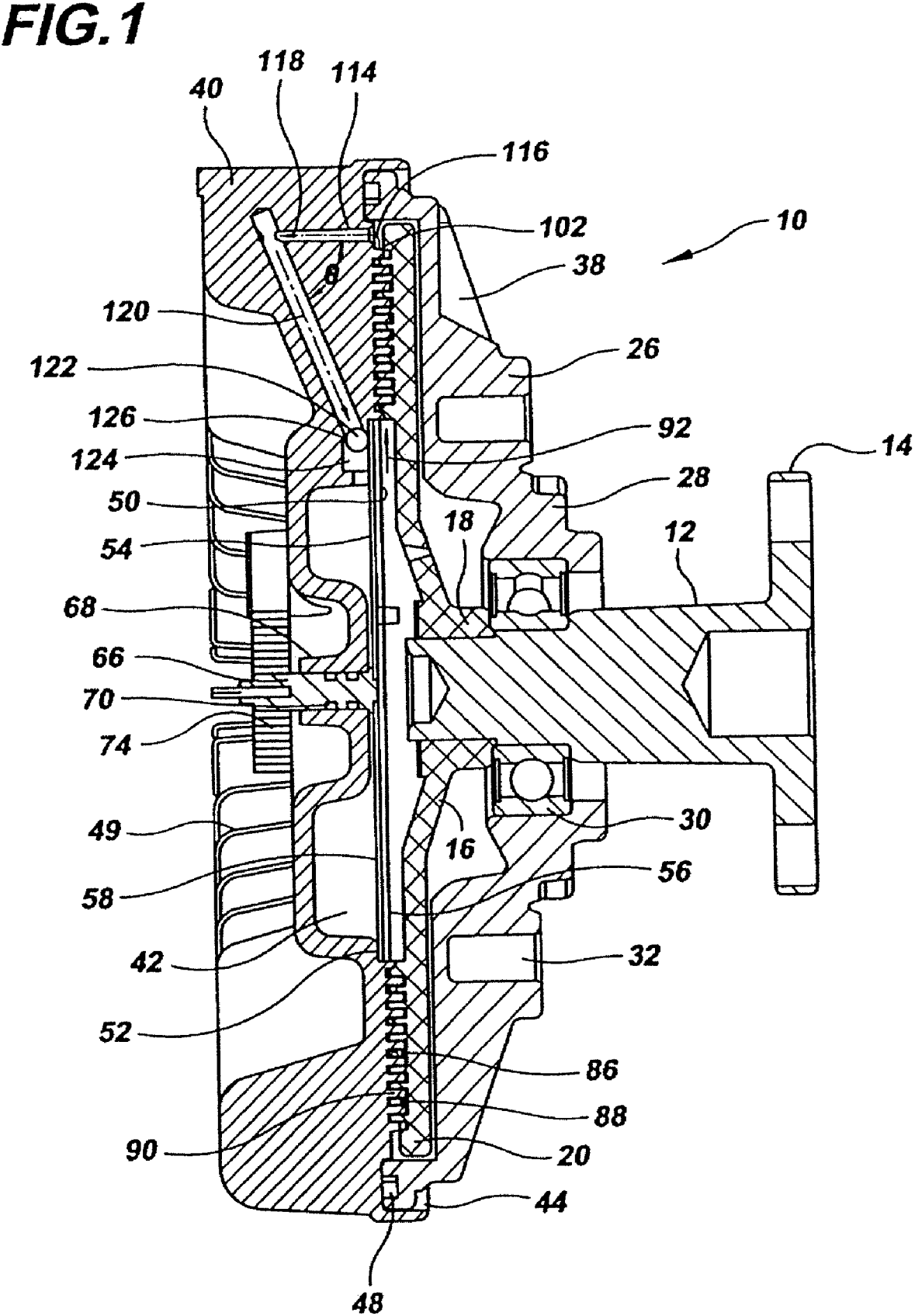
FIG. 1 is an axial sectional view of a viscous fluid clutch assembly according to the present invention.

A viscous fluid clutch assembly indicated generally at 10 is illustrated in FIG. 1. The clutch assembly 10 includes a rotatably driven input shaft indicated generally at 12. The input shaft 12, which can be provided with multiple steps as illustrated in FIG. 1, preferably terminates at its first or innermost end in a flange 14. The flange 14 can be secured to a conventional engine-driven water pump pulley (not illustrated) to drive the clutch assembly 10 as described below, A clutch plate indicated generally at 16 includes a central hub portion 18 and an annular disk portion 20. The central hub portion 18 is fixedly secured to the input shaft 12 to secure the clutch plate 16 onto the input shaft 12. In this construction, the rotational drive of the input shaft 12 is transferred to the clutch plate 16. It is appreciated that other constructions can be utilized to drivingly connect the clutch plate 16 with the input shaft 12.

A housing indicated generally at 26 is a dished member having a central hub 28 rotatably mounted on the input shaft 12 by a bearing 30. A plurality of radially extending bosses 32 are formed on an exterior face of the housing 26. A multi-bladed fan not shown would be attached by threaded fasteners to the bosses 32. A plurality of fins 38 is provided on the outer surface of the housing 26 to dissipate heat transferred from the viscous fluid contained by the assembly 10.

A cover indicated generally at 40 is mounted to a front face of and cooperates with the housing 26 to form a housing assembly having a reservoir 42 for the viscous fluid as described below. The cover 40 is a dished member having an annular outer edge 44 and is secured to the housing 26 by conventional means. An annular seal 48 is interposed at the edge 44 and a front face of the housing 26 to prevent leakage from the interior of the assembly 10. A plurality of fins 49 is provided on an outer surface of the cover 40 to dissipate heat transferred from the fluid.

A partition plate indicated generally at 50 is installed in the interior of the assembly 10. The partition plate 50 is fixedly positioned on a shoulder 52 of the cover 40 and is drivingly secured to the housing 26. The partition plate 50 divides the interior of the assembly 10 into a working chamber 54 and the fluid reservoir 42. In the view of FIG. 1, the working chamber 54 is the interior volume of the assembly 10 to the right of the partition plate 50, while the reservoir 42 is the interior volume to the left of the partition plate 50. For purposes of this specification, a first or rear surface 56 of the partition plate 50 is in communication with the working chamber 54 and a second or front surface 58 of the partition plate 50 is in communication with the reservoir 42.

Figure 2:
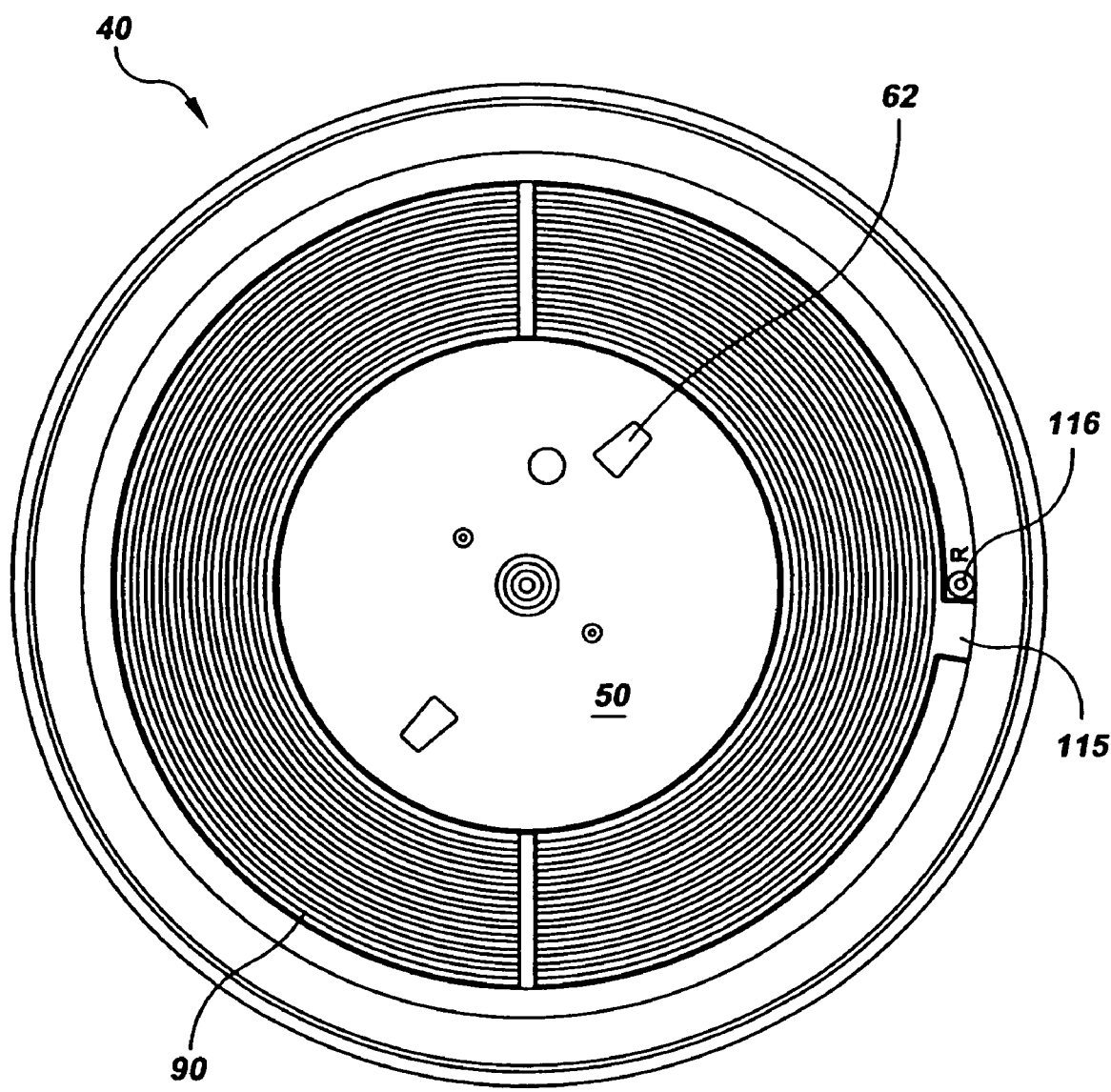
FIG. 2 is a front end view of a cover used in the viscous fluid clutch assembly of FIG. 1.

A single gate or port or preferably a pair of diametrically opposed gates or ports 62 shown more clearly in FIG. 2 are provided in the partition plate 50.

Figure 3:
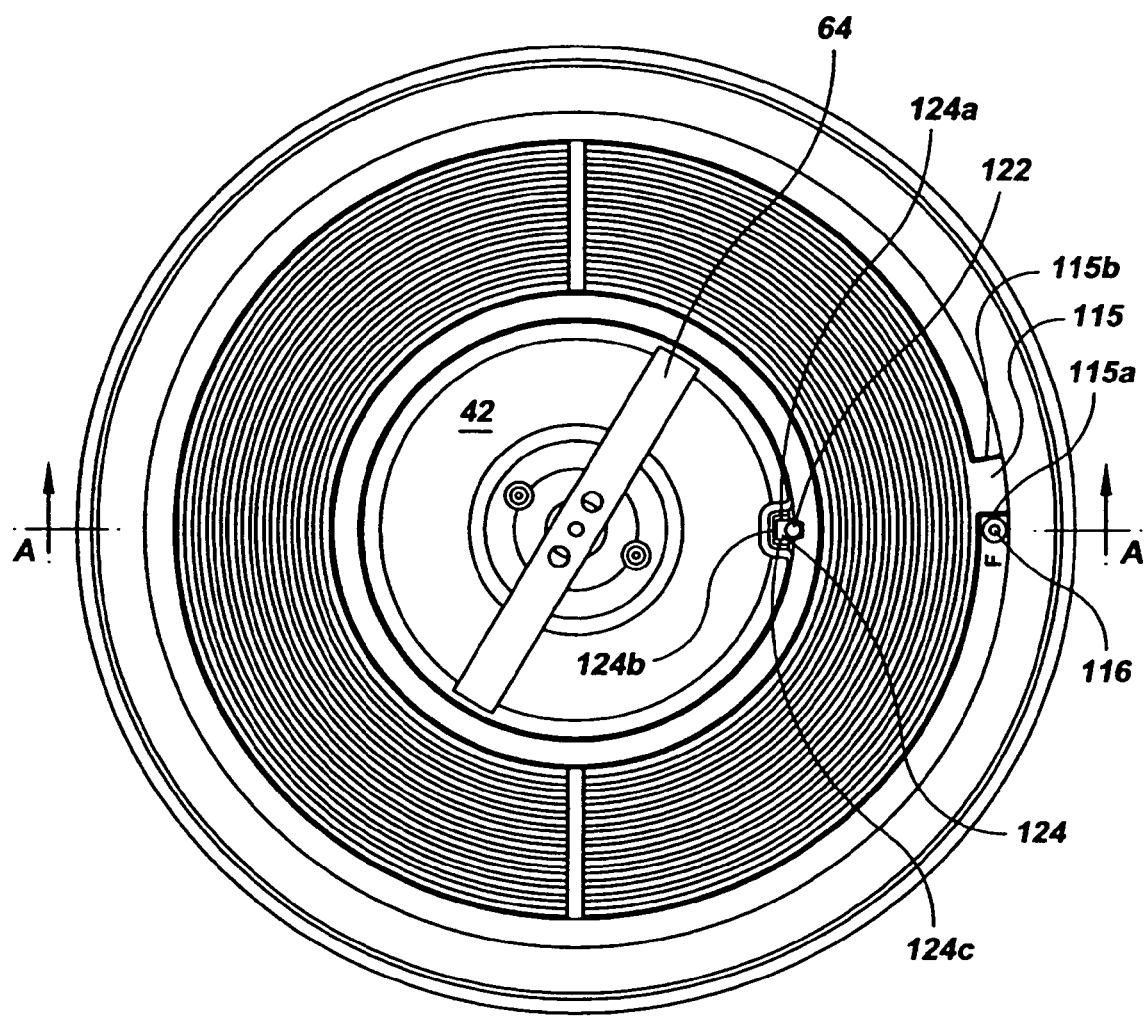
FIG. 3 is the cover of FIG. 2 with the partition plate removed.

A rotatable control arm 64 shown more clearly in FIG. 3 controls the flow of fluid into the working chamber 54 by covering and uncovering the gates 62. Referring back to FIG. 1, The control arm 64 is drivingly connected to a shaft 66, which is rotatably mounted in a tubular hub 68 formed in the cover 40. An O-ring seal 70 is mounted in an annular groove in the shaft 66 and makes peripheral contact with the inner wall of the hub 68 to prevent fluid leakage to the exterior of the assembly 10.

A bimetallic coil 74 is mounted on the forward end of the shaft 66 and together with the shaft 66 defines a control means for controlling the rotatable control arm 64. The bimetallic coil 74 responds to the ambient air temperature surrounding the cover 40. An increase in air temperature causes the coil 74 to contract, thereby rotating the shaft 66 and the control arm 64 to uncover the gates 62 in the partition plate 50. When the air temperature has decreased to a predetermined level, the bimetallic coil 74 expands to its original form, causing the shaft 66 and control arm 64 to rotate back to their original positions, thereby covering the gates 62 in the pump plate 50 and blocking fluid flow. Hydraulic pressure generated by centrifugal force causes the flow of fluid through the gates 62 from the reservoir 42 into the working chamber 54.

A fluid shear zone 86 is formed by the spaces between the interleaved concentric annular lands or ridges 88 and grooves formed on the surface of the disk portion 20 of the clutch plate 16. Corresponding concentric annular lands or ridges 90 and grooves are formed on an interior surface of the cover 40. Fluid sheared in the shear zone 86 transmits input torque from the rotatably driven clutch plate 16 to provide hydraulic drive of the housing assembly which comprises the housing 26 and the cover 40.

Fluid flow through the shear zone 86 is illustrated in FIG. 1 with directional arrows. When the control arm 64 is rotated to uncover the gates 62, fluid flows from the reservoir 42 into the working chamber 54. Centrifugal forces of the rotating clutch assembly 10 direct the fluid into a radial flow as indicated at directional arrow 92 between the concentric annular lands and grooves of the cover 40 and the clutch plate 16. Centrifugal forces cause the fluid to be dispersed radially outwardly throughout the shear zone 86. Fluid friction in the shear zone 86 transmits the rotation of the clutch plate 16 to the housing assembly. As the housing assembly rotates, the attached fan (not shown) is rotated to draw cooling air through a radiator (not illustrated) and cool an internal combustion engine in a well-known manner.

Fluid exits the shear zone 86 and as shown in FIG. 2 contacts a hydraulic dam 115 (having sidewalls 115a and 115b) which changes the direction of the viscous fluid from tangential to axial as indicated at directional arrow 102 into a discharge channel 114 which directs the fluid from the shear zone 86 and working chamber 54 to the reservoir 42.

The discharge channel is formed in the cover 40 and comprises an opening 116 in the cover which terminates at opening 126 at the reservoir 42. The discharge channel preferably comprises a first elongated section 118 fluidly connected to a second elongated section 120. In a preferred embodiment of the invention the discharge channel 114 is articulated and forms an acute angle at the juncture of the first section and second section. This angled discharge channel in combination with the specially designed check valve has been found to provide excellent operating results.

Figure 3A:
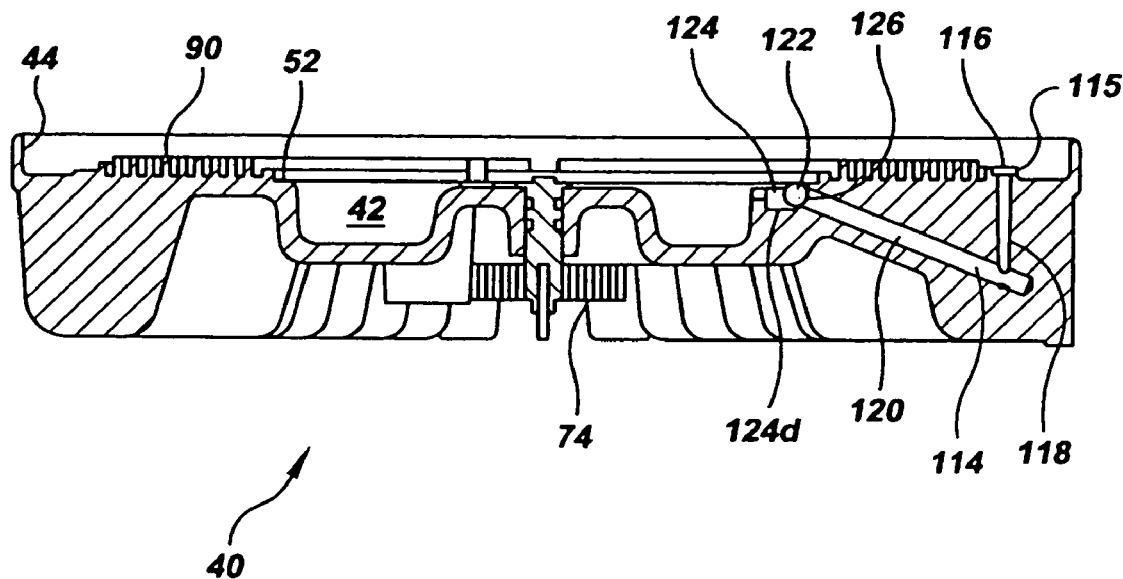
FIG. 3A is a sectional view of FIG. 3 taken along lines 3A-3A showing the ball check valve in the closed position.
Figure 3B:
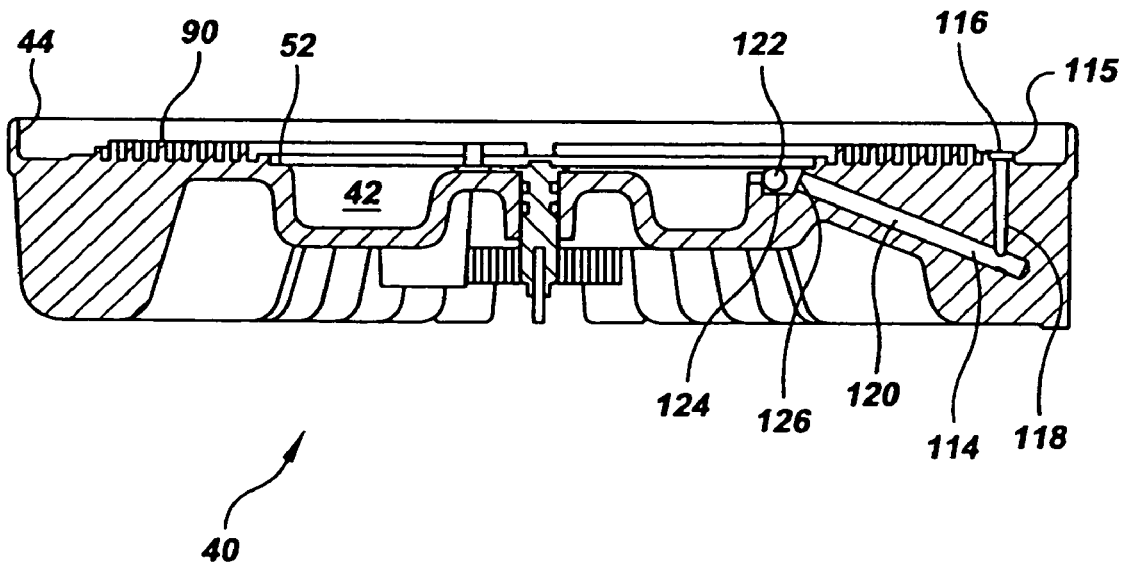
FIG. 3B is the same as FIG. 3A showing the ball check valve in the open position.

The check valve includes a check valve housing 124 which as shown in FIG. 3 is preferably rectangular and has three sides, 124a, 124b, and 124c and a base 124d to retain the ball 122. The ball is held from the top by the partition plate 50. The other side is open to opening 126 of second discharge channel section 120. The ball 122 moves towards and away from the opening depending on the operation of the vehicle. Thus, as shown in FIG. 3A, when the housing assembly is at rest, the ball 122 falls by gravity to close opening 126 thereby preventing fluid from the reservoir 42 from migrating back to the working chamber. As shown in FIG. 3B, when the automobile is being used, centrifugal forces caused by the rotation of the housing assembly forces ball 122 away from the center of the housing assembly covering opening 126. However, fluid pressure in the return channel overcomes the centrifugal force exerted on the ball to modulate its position with respect to the opening. In this position the fluid flows from the working chamber to the reservoir.

The check valve housing 124 is an important feature of the invention and is an integral part of the cover 40 and is configured to hold the ball 122 by the three sides of the valve and by the base 124d and partition plate 50 all with sufficient tolerance to allow free travel of the ball and passage of the fluid from the working chamber to the reservoir. The valve is also sized so that the travel of the ball is preferably limited to less than half its diameter although longer travel may be employed, e.g., 1 diameter or more. This minimizes wear of the ball and enables using a wide variety of commercially available materials such as aluminum, Teflon, fluorocarbon, or other elastomeric materials. Further, the flow of fluid can be controlled by counteracting the shear force generated between the housing assembly and the clutch plate by centrifugal force of the fluid in the discharge channel and the material of the ball would be selected by the amount of torque required for each application.

Broadly stated, the fan clutch of the invention contains the viscous fluid in the reservoir and reduces the time for fan clutch disengagement at engine startup after a period of non-operation. Another benefit is the centrifugal force exerted on the ball in the valve provides a back pressure (resistance) to the fluid being evacuated from the working chamber, thereby providing a gradual reduction of fan speed from the engaged to disengaged state of the fan clutch. The disengaged speed of the fan clutch can be tailored to the density of the ball.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A viscous fluid clutch assembly comprising:
   (a) a clutch plate having a central hub portion and an annular disk portion, the annular disk portion having concentric annular lands and grooves formed on a surface thereof, the clutch plate being rotatably driven by an input shaft;
   (b) a housing assembly rotatably mounted on the input shaft and comprising a housing and a cover, the cover having an inner surface having corresponding annular lands and grooves adjacent the annular lands and grooves on the clutch plate and extending from an inner edge to an outer edge, and a hydraulic dam having sidewalls proximate the outer edge of the annular lands;
   (c) a shear zone disposed between the corresponding lands and grooves of the clutch plate and the cover which interleave to form the shear zone;
   (d) a partition plate mounted internally in the housing assembly between the cover and the clutch plate for dividing an interior of the housing assembly into a fluid reservoir in the cover and a working chamber, wherein the shear zone is disposed in the working chamber;
   (e) openings provided in the partition plate for transferring fluid between the working chamber and the fluid reservoir;
   (f) a rotatable control arm disposed in the interior of the housing assembly adjacent the partition plate for opening or closing the openings in the partition plate;
   (g) control means for controlling the rotatable control arm based on the temperature of the ambient air surrounding the housing;
   (h) a discharge channel provided in the cover at a periphery of the shear zone and adjacent the hydraulic dam, the dam sidewalls contacting the fluid exiting the shear zone and altering the flow of fluid exiting the shear zone from tangential to axial; the discharge channel comprising a first section having a first end in fluid communication with the periphery of the shear zone and a second end, and a second section having a first end in fluid communication with the fluid reservoir and a second end; the second end of the first section and second end of the second section being fluidly connected, and the first section being disposed at an acute angle relative to the second section; and
   (i) a check ball valve provided at the first end of the second section of the discharge channel, wherein the check ball valve and the first end of the second section of the discharge channel are directly connected, the check ball valve includes a ball movable to a closed position blocking the discharge passage to prevent migration of fluid from the reservoir into the discharge channel, whereby the ball is movable by gravity or centrifugal force, and the check ball valve further includes a check valve housing which is rectangular and integrally formed with the inner surface of the cover and comprises three sides, a base, and an open side at the first end of the second section of the discharge channel, wherein the ball is contained in the check valve housing by the three sides and base thereof and the partition plate with sufficient tolerances to allow free travel of the ball to the closed position and to an open position.

2. The viscous fluid clutch assembly of claim 1 wherein the check valve housing is sized so that the ball travels only about half of the ball's diameter and at rest the ball falls by gravity to close the first end of the second section of the discharge channel, and during operation centrifugal forces caused by rotation of the housing assembly forces the ball away from the center of the housing assembly so the ball covers the first end of the second section of the discharge channel, and fluid pressure in the return channel overcomes the centrifugal forces exerted on the ball to modulate the position of the ball with respect to the first end of the second section of the discharge channel allowing the fluid to flow from the working chamber to the reservoir.

* * * * *